(12) United States Patent
Jenkins et al.

(10) Patent No.: US 7,202,998 B2
(45) Date of Patent: Apr. 10, 2007

(54) OPTICAL AMPLIFIER

(75) Inventors: Richard M Jenkins, Malvern (GB); Mark E McNie, Malvern (GB); James McQuillan, Malvern (GB); Craig D Stacey, Malvern (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 10/565,016

(22) PCT Filed: Jul. 23, 2004

(86) PCT No.: PCT/GB2004/003190

§ 371 (c)(1),
(2), (4) Date: Feb. 7, 2006

(87) PCT Pub. No.: WO2005/013443

PCT Pub. Date: Feb. 10, 2005

(65) Prior Publication Data

US 2006/0182384 A1     Aug. 17, 2006

(30) Foreign Application Priority Data

Jul. 26, 2003  (GB) ................... 0317530.4

(51) Int. Cl.
*H01S 3/00* (2006.01)
(52) U.S. Cl. .................................... 359/342
(58) Field of Classification Search ............... 354/342; 385/31, 50, 125
See application file for complete search history.

(56) References Cited

U.S. PATENT DOCUMENTS 5,410,625 A    4/1995 Jenkins et al.

(Continued)

FOREIGN PATENT DOCUMENTS

JP    409021922 A  *  1/1997

(Continued)

OTHER PUBLICATIONS

International Search Report of PCT/GB2004/003190, mailed Dec. 21, 2004.

(Continued)

*Primary Examiner*—Mark Hellner
(74) *Attorney, Agent, or Firm*—Nixon & Vanderhye P.C.

(57) ABSTRACT

Optical circuits for optical amplifier input and output stages are described. The input stage circuit (42) comprises a first optical waveguide (46) for carrying a signal beam to be amplified, a second optical waveguide (62) for carrying a pump beam, a beam combining means (58) optically coupled to the first and second optical waveguides (46, 62) for producing a combined signal/pump beam, and means for optically coupling the combined signal/pump beam into an amplifying optical fibre (63). The output stage circuit (44) comprises a first output optical waveguide (64), an optical fibre attachment means arranged to receive an amplifying optical fibre (63) and an optical fibre attachment means arranged to receive an output optical fibre (76) wherein light from the amplifying optical fibre (63) is optically coupled to the output optical fibre (76) via the first output optical waveguide (64). The first and second optical waveguides (46, 62) and the first output optical waveguide (64) are hollow core optical waveguides formed as channels in a substrate. A fibre amplifier, in particular an erbium doped fibre amplifier, comprising such optical circuits is also described.

34 Claims, 3 Drawing Sheets

U.S. PATENT DOCUMENTS

2004/0076372 A1    4/2004    Philipsen et al.

FOREIGN PATENT DOCUMENTS

| WO | 02/10801 | A1 | 2/2002 |
| WO | 02/075864 | A2 | 9/2002 |
| WO | 03/065091 | A2 | 8/2003 |

OTHER PUBLICATIONS

GB Search Report of GB 0317530.4, dated Jan. 19, 2004.

Miura et al., "Hollow Optical Waveguide for Temperature-Insensitive Photonic Integrated Circuits", Japanese Journal of Applied Physics, vol. 40, No. 7A, Part 2, Jul. 1, 2001, pp. L688-L690, XP001077922.

McMullin et al., "Hollow Metallic Waveguides in Silicon V-Grooves", IEEE Photonics Technology Letters, vol. 5, No. 9, Sep. 1, 1993, pp. 1080-1082, XP000414182.

Miura et al., "Propagation Characteristics of Hollow Optical Waveguide for Temperature-Insensitive Photonic Integrated Circuits".

* cited by examiner

OPTICAL AMPLIFIER

This application is the US national phase of international application PCT/GB2004/003190, filed 23 Jul. 2004, which designated the U.S. and claims priority of GB 0317530.4, filed 26 Jul. 2003, the entire contents of each of which are hereby incorporated by reference.

The present invention relates to an optical circuit for an optical amplifier, and more particularly to an erbium doped fibre amplifier (EDPA).

Erbium doped fibre amplifiers are known. A typical EDFA comprises a number of optical components that are arranged such that a signal beam (e.g. of wavelength 1550 nm) and a pump beam (e.g. of wavelength 980 nm) are combined and coupled into an erbium doped optical fibre. The pump beam is selected so as to cause amplification of the signal beam within the erbium doped fibre.

EDFA circuits have previously been implement using optical components rigidly held in place with light coupled between them in free space. However, maintaining the necessary alignment of such components can prove difficult especially when the arrangement is subjected to mechanical shock. It is also known, and more common in the art, to optically couple the required optical components together using lengths of optical fibre. Although such an implementation provides an EDFA device having increased robustness, it is difficult to make such arrangements compact as each component is individually packaged and includes a fibre interface. Furthermore, the optical losses associated with the various optical fibre interfaces can dramatically reduce device performance.

It is an object of the present invention to mitigate at least some of the disadvantages of prior art EDFA optical circuit arrangements.

According to a first aspect of the present invention, an optical circuit for a optical amplifier input stage comprises a first optical waveguide for carrying a signal beam to be amplified, a second optical waveguide for carrying a pump beam, a beam combining means optically coupled to the first and second optical waveguides for producing a combined signal/pump beam, and means for optically coupling the combined signal/pump-beam into an amplifying optical waveguide, characterised in that the first and second optical waveguides are hollow core optical waveguides formed as channels in a substrate.

An optical circuit is thus provided which can combine a signal beam with a pump beam and couple the combined signal/pump beam into an amplifying optical waveguide such as an erbium doped optical fibre. The guiding of light within hollow core waveguides formed as channels in a substrate provides a more compact and robust optical arrangement than prior art free space or optical fibre coupled systems. Furthermore, the number of fibre end reflections are reduced compared to prior art fibre coupled systems thereby decreasing the optical losses that are associated with the circuit.

It should be noted that when hollow core optical waveguide structures are produced, the hollow core is likely to fill with air. However, this should be seen in no way as limiting the scope of this invention. The hollow core may contain any fluid (for example a liquid or an inert gas such as nitrogen) or be a vacuum. The term hollow core simply means a core which is absent any solid material. Furthermore, the terms "light" and "optical" are used herein to refer to any electromagnetic radiation having a wavelength from the deep ultraviolet to the far infra-red.

Conveniently, the beam combining means is formed monolithically from the substrate. Alternatively, the beam combining means is a discrete component held in an alignment slot formed in the substrate.

Advantageously, the optical circuit further comprises a laser source arranged to couple a pump beam into the second hollow core optical waveguide. The laser may be a discrete component held in alignment in a slot formed in the substrate. Alternatively, if the substrate is formed from an appropriate material the laser source may be formed monolithically from the substrate.

Conveniently, first optical fibre attachment means are provided to receive an input optical fibre, the first optical fibre attachment means being arranged such that any signal beam carried by an attached input optical fibre is coupled into the first hollow core optical waveguide. The optical fibre attachment means may comprise an alignment slot or V-groove formed in the substrate and arranged to hold a solid core optical fibre in place thereby allowing optical inputs/outputs to be made to the optical circuit. Stepped optical fibre alignment slots may also be provided to hold both the buffer layer and the cladding. Spring clips or micro-grippers may also be provided to secure the optical fibre in place.

The alignment of the core of a hollow core optical fibre with a hollow core waveguide of the optical circuit, achieved for example by clamping the optical fibre cladding in a alignment slot, would also be advantageous as the air core to air core connection would be free from any unwanted reflections.

To provide efficient coupling between the core of an optical fibre and the hollow core waveguide of the optical circuit, the cross-section of the hollow core waveguide should be appropriate for the cross-section of the optical fibre core. In the case of solid core fibres, leakage into the cladding means that the width of the mode carried by the fibre is actually greater than the core diameter; for example typically the 10 µm solid core of a single mode glass fibre has a total field width of around 14 µm diameter. If the mode width of the fibre is different to that of the hollow core waveguide, lensed fibres may be used so that the optical field is expanded or reduced as appropriate to enable light to be coupled to/from fibres with a different size core to that of the hollow core waveguide. The hollow core waveguide of the optical circuit may also be tapered to expand/reduce the optical field as it propagates through the device. Alternatively, discrete lenses (e.g. ball or GRIN rod etc) can be located in the substrate and used to reduce/expand the optical field from a fibre end as required. The lenses may carry an anti-reflection coating. Fibre ends of solid core fibres may also be anti-reflection coated to reduce optical losses.

Conveniently, at least one optical isolator is located within the optical path defined by the first hollow core optical waveguide. The provision of an optical isolator ensures reflections within the optical circuit are not coupled back into the input optical fibre.

Advantageously, at least one variable optical attenuator is located within the optical path defined by the first hollow core optical waveguide. A VOA can be used to attenuate the optical power coupled into the amplifying optical waveguide. This may be used to control the device output power. The VOA may also be used as a protection shutter to prevent the signal beam reaching the amplifying waveguide during device warm-up.

The amplifying optical waveguide may comprise an amplifying material formed as an elongate waveguide in or on the substrate. For example, a track of erbium doped waveguide material may located in a suitable trench formed in the substrate, portions of the substrate may be doped with suitable material or a waveguide path may be defined by selectively locating appropriate material on top of the substrate etc. In this manner, a compact device can be produced. The elongate waveguide track may be formed in any required shape; for example a spiral or serpentine track may be provided.

Alternatively, the amplifying optical waveguide may comprise an amplifying optical fibre. The amplifying optical fibre may be any amplifying optical fibre of known type (e.g. Erbium doped optical fibre etc).

Preferably, the means for coupling the combined signal/pump beam produced by the beam combining means into an amplifying optical fibre comprises a third hollow core optical waveguide formed as a channel in the substrate, the third hollow core optical waveguide being arranged to receive the combined signal/pump beam from the combining means. In other words, the combined signal/pump beam is coupled into a hollow core optical waveguide from the beam combining means. Alternatively, the combined signal/pump beam could be coupled directly into the amplifying optical fibre. A third hollow core waveguide may also be used to couple the signal/pump beam into the elongate amplifying waveguide.

Conveniently, second optical fibre attachment means are provided to receive the amplifying optical fibre, the second optical fibre attachment means being arranged to couple the combined signal/pump beam from the third hollow core optical waveguide into an attached amplifying optical fibre.

Advantageously, at least one optical tap is provided to extract light from the first optical waveguide. The optical tap may advantageously be a hollow core multi-mode interference (MMI) device of the type described in GB2003/000331 and GB2003/000370. The light extracted from the first optical waveguide can then be analysed. For example, light extracted from the first optical waveguide may be directed to a first photodiode thereby allowing the input optical power to be monitored. If a VOA is provided, the signal beam could be attenuated in response to the measured optical power so that a beam of the required optical power level is provided. Alternatively, the power of the pump beam may be varied (e.g. by varying the electrical power supplied to the pump laser) to control amplification of the signal beam in the amplifying fibre.

According to a second aspect of the invention, an optical circuit for an optical amplifier output stage comprises a first output optical waveguide arranged to receive light from an amplifying optical waveguide and an optical fibre attachment means arranged to receive an output optical fibre, wherein light from the amplifying optical waveguide is optically coupled to the output optical fibre via the first output optical waveguide, characterised in that the first output optical waveguide is a hollow core optical waveguide formed as a channel in a substrate.

An optical circuit for the output stage of an optical amplifier is thus provided that couples the amplified output beam from an amplifying optical waveguide into an output optical fibre via a section of hollow core optical waveguide formed in a substrate. The circuit provides a convenient way of coupling light between fibres, and overcomes the various alignment and attachment problems that are typically associated with direct fibre to fibre optical coupling.

In common with the input stage, the amplifying optical waveguide may be an amplifying material formed as an elongate waveguide in or on the substrate or may comprise an amplifying optical fibre.

Conveniently, a second output hollow core optical waveguide for carrying a pump beam is formed as a channel in the substrate and means are provided to optically couple the pump beam from the second output hollow core optical waveguide into an amplifying optical waveguide via the first output hollow core optical waveguide. A laser source may also be arranged to couple a pump beam into the second output hollow core optical waveguide. In this manner, backwards pumping of the amplifying fibre can be implemented thereby increasing the maximum possible amplification.

Conveniently, at least one optical isolator is provided within the optical path defined by the first output hollow core optical waveguide.

At least one optical tap may advantageously be provided within the optical path defined by the first output hollow core optical waveguide. The tapped off optical power may be directed to a second photodiode, thereby enabling the optical power output of the amplifier to be monitored.

Conveniently, at least one optical filter is provided within the optical path defined by the first output hollow core optical waveguide. The provision of an optical filter ensures pump radiation is not coupled into the output optical fibre.

Any of the various optical components described above Oasers, filters, optical isolators etc) may be located in alignment slots formed in the substrate. The alignment slots are appropriately shaped to accept the component and may thus be deeper/shallower and/or wider/narrower than the various hollow core optical waveguides as necessary. Spring clips or micro-grippers may be used to secure the components in place.

Furthermore, the alignment slot may also be fabricated with sufficient accuracy to align the optical component that it receives. Placing an optical component in such an alignment slot will thus inherently align the optical component and a component alignment or adjustment step is not required. In other words, the present invention may provide passive alignment of optical components instead of requiring an active alignment step in which the position of a component is adjusted (e.g. by hand) until the desired alignment is achieved. Conventional pick and place techniques of the type used in the manufacture of electronic circuits and the like could be used to place the optical components in the associated alignment slot. Alternatively, pick and place techniques may provide the necessary alignment. For example, a component could be accurately aligned when placed and then fixed (e.g. glued) to remain in alignment.

The alignment slots and (especially) the optical components are manufactured with a certain size tolerance. The coupling efficiency between a optical component and an associated hollow core optical waveguide will reduce as the angular error of alignment of the optical component with respect to the hollow core waveguide increases. However, reduction of the cross-sectional dimensions of the hollow core waveguide will increase the acceptable angular alignment tolerance, albeit at the expense of slightly increased losses in the optical waveguide due to the reduced core dimensions and increased (tighter) lateral alignment tolerances. Therefore, knowledge of the alignment tolerances that will be achieved with a certain optical component (e.g. from knowledge of the manufacturing tolerances of the optical component) will permit the dimensions of the hollow core waveguide to be selected to ensure a high coupling efficiency.

According to a third aspect of the invention, an optical circuit for an optical amplifier comprises an optical circuit for an amplifier input stage according to the first aspect of the invention and an optical circuit for an amplifier output stage according to the second aspect of the invention. In this manner, a complete optical circuit for an optical amplifier is provided. The input and output stages of the optical circuit may advantageously be formed on a single substrate thereby providing a compact and robust optical arrangement.

Advantageously, the optical circuits described above may be formed in a substrate comprising semiconductor material. Semiconductor substrates, such as Silicon, can conveniently be etched to provide hollow core waveguides with high accuracy using micro-fabrication techniques. The substrate may advantageously comprise a multiple layer wafer; for example SiGe, silicon-on-insulator (SOI), silicon-on-glass or GaAs-on-silicon. A person skilled in the art would recognise that micro-fabrication techniques typically involve a lithography step to define a pattern, followed by an etch step to transfer the pattern in to one or more layers on, or in, the substrate material. The lithography step may comprise photolithography, x-ray or e-beam lithography. The etch step may be performed using ion beam milling, a chemical etch or a dry plasma etch. Advantageously, the optical circuit is formed by deep reactive ion etching (also termed a deep dry etch or a deep silicon etch). Micro-fabrication techniques of this type are also compatible with various layer deposition techniques such as sputtering, CVD and electroplating.

Although substrates that comprise semiconductor material can advantageously be used, the device could also be formed on a variety of alternative substrate. For example, quartz, silica or glass substrates could be used. Conveniently, the substrate used in the present invention can readily have semiconductor processing techniques applied thereto. It should be noted that although semiconductor processing techniques are, by definition, developed for use with semiconductor substrates they may also be advantageously applied to certain non-semiconductor substrates where the semiconductor properties of the substrate are not required.

Advantageously, the hollow core optical waveguides of the device have a substantially rectangular (which herein shall include square) cross-section. A square, or almost square, cross-section hollow core waveguide provides a waveguide in which the losses are substantially polarisation independent and is preferred when the polarisation state of the light is unknown or varying. Dimensioning the waveguide to have a depth greater than its width increases polarisation dependent losses, but may be advantageous when the polarisation state of light propagating through the waveguide is known. Although rectangular cross-section waveguides are convenient, many alternative waveguide shapes could be employed. For example, circular, elliptical or v-shaped waveguides could be provided.

Advantageously, the hollow core optical waveguides are dimensioned to preferentially guide radiation propagating in the fundamental mode (i.e. higher order mode are attenuated by the waveguide). Alternatively, the hollow core optical waveguides may be arranged to support the propagation of multiple modes but the optical circuit arranged such that light is coupled into the waveguides in a manner which excites only the fundamental mode thereof.

Conveniently, the internal surfaces of the hollow core optical waveguides carry a reflective coating. The material providing the reflective coating may be a layer of metal such as gold, silver or copper. Metals will exhibit a suitably low refractive index over a wavelength range that is governed by the physical properties of the metal; standard text books such as "the handbook of optical constants" by E. D. Palik, Academic Press, London, 1998, provide accurate data on the wavelength dependent refractive indices of various materials. In particular, gold has a refractive index less than that of air at wavelengths within the range of around 500 nm to 2.2 μm; this encompasses wavelengths within the important telecommunications band of 1400 nm to 1600 nm. Copper exhibits a refractive index less than unity over the wavelength range of 560 nm to 2200 nm, whilst silver has similar refractive index properties over a wavelength range of 320 nm to 2480 nm. It can thus be seen that the reflective properties of the hollow core waveguides can readily be tailored to efficiently guide light of both pump and signal beam wavelengths.

A layer of metal may be deposited using a variety of techniques known to those skilled in the art. These techniques include sputtering, evaporation, chemical vapour deposition (CVD) and (electro or electro-less) plating. CVD and plating techniques allow the metal layers to be deposited without significant direction dependent thickness variations. Sputtering using a rotating sample and/or source would also provide more even coverage. Plating techniques are especially advantageous as they permit batch (i.e. multi-substrate parallel) processing to be undertaken. In particular, electroless plating is preferred for conformality.

A skilled person would recognise that adhesion layers and/or barrier diffusion layers could be deposited prior to depositing the layer of metal. For example, a layer of chrome or titanium could be provided as an adhesion layer prior to the deposition of gold. A diffusion barrier layer, such as platinum, may also be deposited on the adhesion layer prior to gold deposition. Alternatively, a combined adhesion and diffusion layer (such as titanium nitride, titanium tungsten alloy or an insulating layer) could be used.

The reflective coating may also be provided by a stack of layers of any one or more of metal, dielectric, or semiconductor; for example dielectric stacks or metal-dielectric stacks may be provided. The reflective properties of any multiple layer stack may also be dependent, to some extent, on the properties of the material on which they are deposited. Hence, the material of the substrate may also form a base layer, and be a part of, any such multiple layer stack.

In the case of a dielectric stack, a person skilled in the art would recognise that the optical thickness of a dielectric layer(s) provides an interference effect that will determine the reflective properties of the coating. The dielectric material may be deposited by CVD or sputtering or reactive sputtering. Alternatively, a dielectric layer could be formed by chemical reaction with a deposited metal layer. For example, a layer of silver could be chemically reacted to produce a thin surface layer of silver halide.

If a reflective coating is provided, the number of materials that can be used to form the substrate is greatly increased. For example, plastic waveguide devices may be fabricated by techniques including hot embossing or injection moulding. The technique involves forming a master. The master may be formed in semiconductor material, such as silicon, using a deep dry etch. Alternatively, the master may be formed by electro deposition of layers using the LIGA or UV LIGA technique. Once the master is formed, the hollow core waveguides may be formed in a plastic substrate by stamping (i.e. pressing) or hot stamping. A master may also be fabricated which is suitable for forming a sub-master that can be used to form the hollow core waveguides in the plastic substrate. Hollow plastic waveguides can thus be formed and coated with a reflective coating. The plastic hollow core waveguides that carry the reflective coating may also be formed from plastic or a polymer. For example, the hollow core waveguides could be formed using a lithographic process on a "spin-on" polymer coating (e.g. SU8 available from Microchem. Corporation)

Conveniently, the substrate comprises a base portion and a lid portion. In other words, two pieces of material may be combined to form the hollow core waveguide structures of the device. The base portion may be formed from a different material to the lid portion. This would allow, for example, the hollow core waveguide and certain optical components to be formed in a base portion (e.g. made of silicon) whilst certain electronic and/or electro-optic components (e.g. photo-diode/laser etc) are formed in a GaAs lid portion. Alternatively, all the optical components and channels may be formed in the base portion whilst a substantially flat piece of material forms the lid portion; this arrangement would not require any lid/base alignment step during assembly. Such arrangements provide a convenient means of producing the necessary hollow core waveguides and are described in more detail in PCT patent application GB2003/000331.

According to a fourth aspect of the invention, an optical amplifier comprises an optical circuit according to any of the first, second or third aspects of the invention. Advantageously, the amplifier further comprises an erbium doped optical fibre. Typically erbium doped optical fibres can be used to amplify radiation in the wavelength range of 1525 nm to 1610 nm. Alternative amplifying optical fibres, for example any rare-earth-doped silica fibres, may be used. More information about such fibres can be found on page 479 of Saleh and Teich, Fundamentals of Photonics, John Wiley and Sons, 1991, ISBN 047183965-5.

The invention will now be described, by way of example only, with reference to the following drawings in which.

Figure 1:
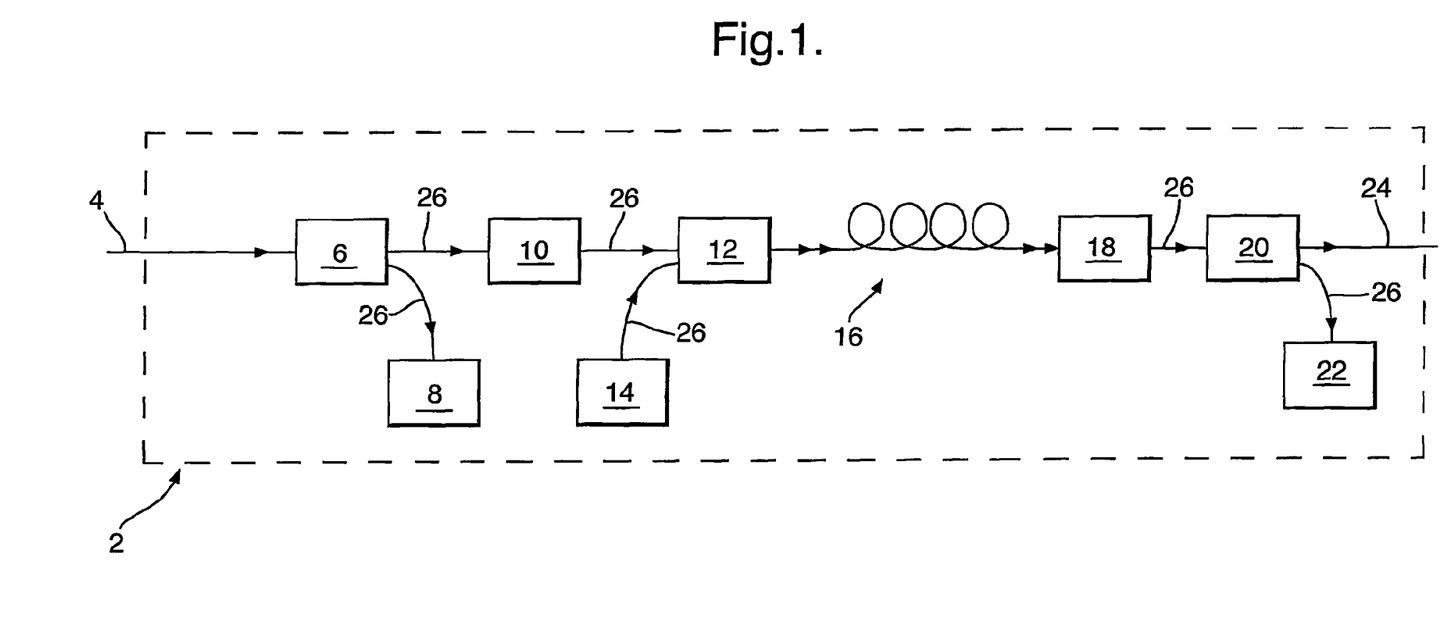
FIG. 1 illustrates a prior art fibre coupled EDFA.

Referring to FIG. 1, a prior art EDFA 2 is shown. The EDFA is arranged to receive an input signal beam having a wavelength of 1550 nm via an input optical fibre 4. A first tap coupler 6 is arranged to direct a small proportion of the signal beam received from the input optical fibre 4 to a first photodiode 8. The remainder of the input signal beam is directed, via an optical isolator 10, to a wavelength division multiplexer 12 where it is combined with a pump beam having a wavelength of 980 nm generated by a pump laser source 14. The combined pump/signal beam is then coupled into a length of erbium doped optical fibre 16.

After amplification in the erbium doped optical fibre, the amplified signal beam is passed through a second optical isolator 18 and directed to a second tap coupler 20. The second tap coupler directs a small proportion of the amplified signal beam to a second photodiode 22, and the remainder of the amplified beam exits the device via an output optical fibre 24.

All of the optical links between the various components of the prior art EDFA described above are provided by discrete lengths of optical fibre 26. In order to maximise optical efficiency, the fibre ends are all anti-reflection coated and fibre alignment means are provide for each discrete optical component. Although such an implementation is fairly mechanically robust, the cost of packaging each of the individual optical components and providing fibre interconnects is high and the arrangement can not be readily reduced in size.

Figure 2:
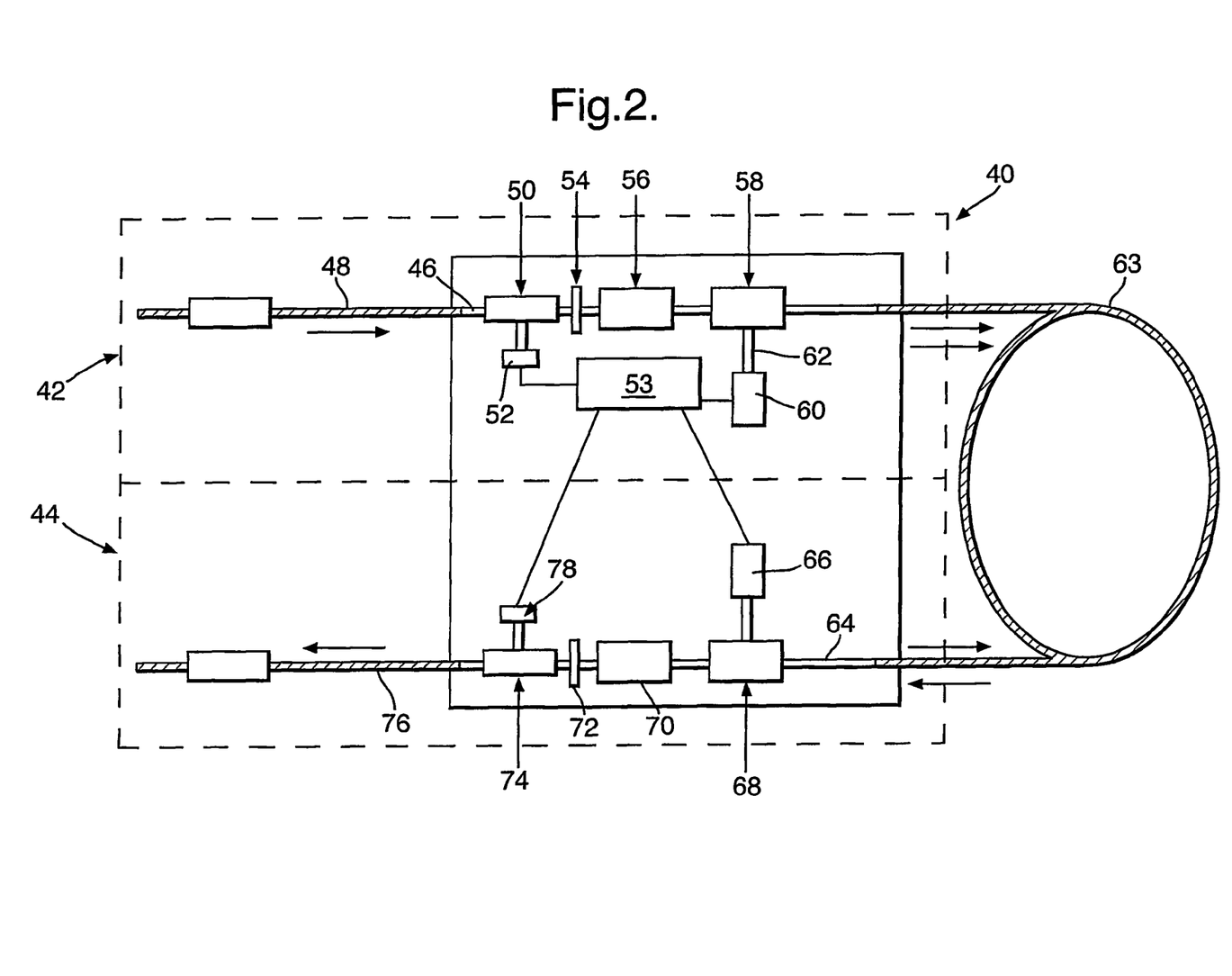
FIG. 2 shows an EDFA according to the present invention.

Referring to FIG. 2, an EDFA circuit 40 according to the present invention is shown. The circuit comprises an input stage 42 and an output stage 44.

A signal beam having a wavelength of 1552 nm is coupled into a first hollow core optical waveguide 46 of the input stage 42 of the EDFA circuit 40 via an input optical fibre 48. A portion of the input beam is tapped from the first hollow core optical waveguide 46 by an optical tap 50 and directed to a first photodiode 52 via a further section of hollow core waveguide. The signal beam propagating through the first hollow core optical waveguide 46 is then attenuated, if required, by a variable optical attenuator (VOA) 54 before passing through an optical isolator 56 to a first multiplexer 58.

The first multiplexer 58 also receives a pump beam having a wavelength of 980 nm from a first laser diode 60 via a second hollow core optical waveguide 62. Although not shown in FIG. 2, a photo-diode could also be provided to monitor pump output power. The combined pump/signal beam is then coupled into a further section of hollow core waveguide and coupled therefrom into the first end of a length of erbium doped optical fibre 63. Although not shown in FIG. 2, the fibres may comprises lensed ends, or discrete lenses may be located in the substrate, to improve optical coupling between the hollow core waveguides of the EDPA circuit and the associated optical fibre.

The second end of the erbium doped optical fibre 63 is coupled to a third hollow core optical waveguide 64 formed in the output stage 44 of the circuit. In order to maximise amplification in the erbium doped optical fibre 62, a second "backward" pump beam may also be provided that is produced by a second laser diode 66 and coupled into the third hollow core optical waveguide 64 using a second multiplexer 68. The second pump beam is arranged to propagate along the third hollow core optical waveguide 64 in the opposite direction to the amplified signal beam and is thus coupled into the erbium doped fibre 63. In this manner, the erbium doped fibre is pumped from both ends thereby increasing the level of amplification that it can provide.

The amplified signal beam received from the erbium fibre 63 propagates along the third hollow core optical waveguide and passes through the second multiplexer 68, an optical isolator 70, a line filter 72 and a second optical tap 74 before being coupled into an output optical fibre 76. The second optical tap 74 extracts a small proportion of the signal beam and directs it to a second photodiode 78.

In use, the input beam intensity is measured by the first photodiode 52, and the output (i.e. amplified) beam intensity is measured by the second photodiode 78. The outputs of the first and second photodiodes 52 and 78 are monitored by control circuitry 53 and the output power of the pump lasers 60 and 66 is altered accordingly to provide the required level of amplification. The VOA 54 also allows the beam to be attenuated prior to amplification if required.

The hollow waveguides of the EDFA circuit 40 are formed from a substrate having a base portion and a lid portion. Typically, alignment slots are provided in the base portion to receive the various discrete optical components of the circuit. The alignment slots may be provided with sufficient accuracy that the component self-align when placed in there respective slots. This passive alignment ensures the optical components are aligned with respect to the hollow waveguides of the substrate without the need for an active alignment step prior to component attachment. The skilled person would appreciate that certain optical structures could alternatively be formed monolithically from the substrate.

The lid portion may simply comprise a substantially flat piece of material that is attached (e.g. glued using a layer of epoxy) to the base portion in order to fully define the hollow core waveguides. Alternatively, optical components or structures (e.g. cavities corresponding to components in the base portion) may be formed in or attached to the lid portion. The lid portion may also be formed from a different material to the base portion. For example, the base portion may be formed from silicon, whilst the lid portion is formed from GaAs. This would enable alignment slots to be formed in the silicon base portion whilst control electronics and/or electro-optic components (e.g. photodiodes, lasers etc) are formed in the GaAs lid portion.

Figure 3:
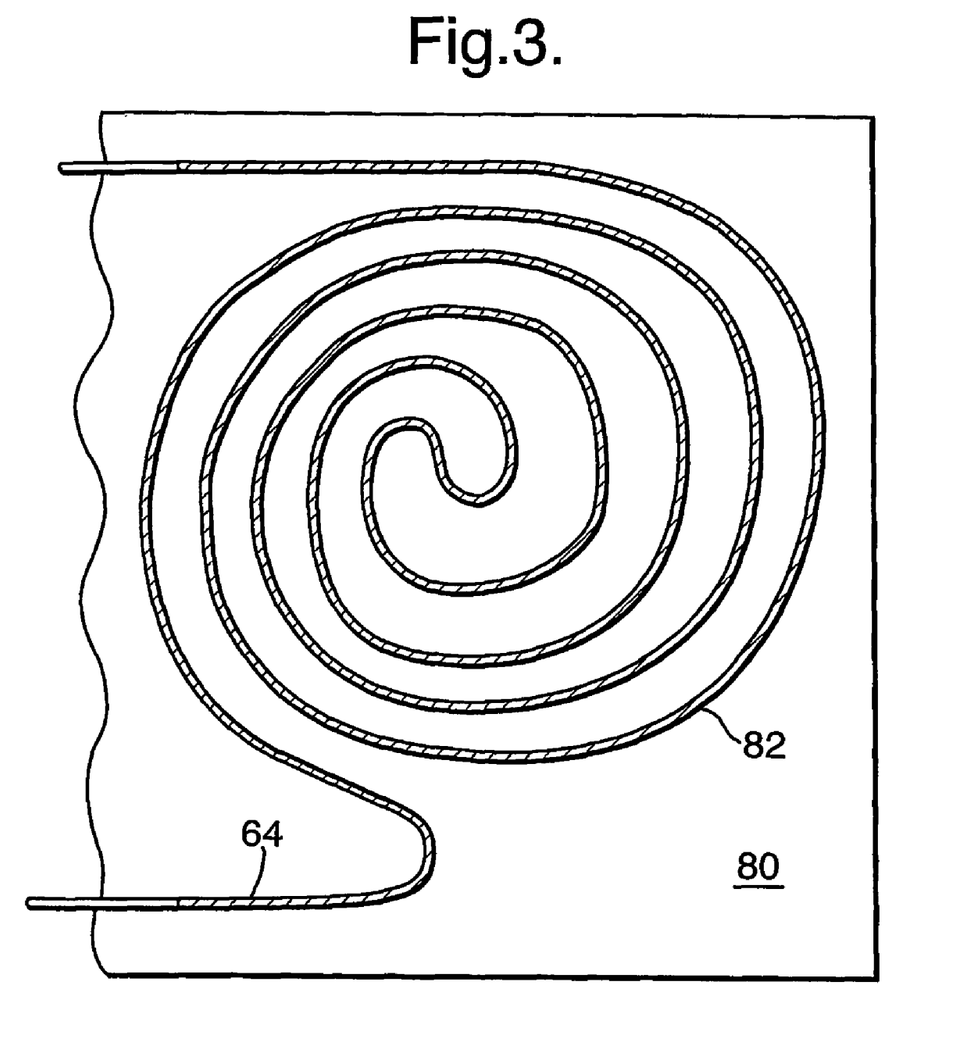
FIG. 3 shows a rare earth doped waveguide of the present invention.

Referring to FIG. 3, it should be noted that the device described above may alternatively be used with an amplifying optical waveguide 82 formed in or on a substrate 80 rather than an optical fibre. Hollow core optical waveguide 64 could link the amplifying optical waveguide 82 to the input and/or output stages described above. The amplifying optical waveguide may have a spiral or serpentine shape or any other appropriate shape.

The optical waveguide 82 may be formed by locating a rare earth doped material (e.g. erbium doped glass) in a trench formed in the substrate. The trench in which the amplifying material is located may be formed using the same fabrication techniques used to form the hollow core optical waveguides. The trench could even be formed using at least some of the processing steps that are used to form the hollow core waveguide. Alternatively, the optical waveguide 82 may comprise a track of amplifying optical material located on the substrate. Various techniques for forming such a waveguide would be well known to those skilled in the art.

A skilled person would also recognise the numerous alternative optical arrangements that could be used to implement a circuit of the present invention.

The invention claimed is:

1. An optical circuit for an optical amplifier input stage comprising:
   a first optical waveguide for carrying a signal beam to be amplified,
   a second optical waveguide for carrying a pump beam,
   a beam combining means, optically coupled to the first and second optical waveguides, for producing a combined signal/pump beam, and
   means for optically coupling the combined signal/pump beam into an amplifying optical waveguide, wherein the first and second optical waveguides are hollow core optical waveguides formed as channels in a substrate.

2. An optical circuit according to claim 1 wherein the beam combining means is formed monolithically from the substrate.

3. An optical circuit according to claim 1 wherein the beam combining means is a discrete component held in an alignment slot formed in the substrate.

4. An optical circuit according to claim 1 and further comprising a laser source arranged to couple a pump beam into the second hollow core optical waveguide.

5. An optical circuit according to claim 1 wherein first optical fibre attachment means are provided to receive an input optical fibre, the first optical fibre attachment means being arranged such that any signal beam carried by an attached input optical fibre is coupled into the first hollow core optical waveguide.

6. An optical circuit according to claim 1 wherein at least one optical isolator is located within the optical path defined by the first hollow core optical waveguide.

7. An optical circuit according to claim 1 wherein at least one variable optical attenuator is located within the optical path defined by the first hollow core optical waveguide.

8. An optical circuit according to claim 1 wherein the amplifying optical waveguide comprises an amplifying material formed as an elongate waveguide in or on the substrate.

9. An optical circuit according to claim 1 wherein the amplifying optical waveguide comprises an amplifying optical fibre.

10. An optical circuit according to claim 9 wherein the means for coupling the combined signal/pump beam produced by the beam combining means into an amplifying optical fibre comprises a third hollow core optical waveguide formed as a channel in the substrate, the third hollow core optical waveguide being arranged to receive the combined signal/pump beam from the combining means.

11. An optical circuit according to claim 10 wherein second optical fibre attachment means are provided to receive an amplifying optical fibre, the second optical fibre attachment means being arranged to couple the combined signal/pump beam from the third hollow core optical waveguide into an attached amplifying optical fibre.

12. An optical circuit according to claim 1 and further comprising at least one optical tap to extract light from the first hollow core optical waveguide.

13. An optical circuit according to claim 12 and further comprising a first photodiode, wherein light extracted from the first hollow core optical waveguide is directed to the first photodiode.

14. An optical circuit for an optical amplifier output stage comprising:
   a first output optical waveguide arranged to receive light from an amplifying optical waveguide; and
   an optical fibre attachment means for receiving an output optical fibre wherein light from the amplifying optical waveguide is optically coupled to the output optical fibre via the first output optical waveguide, wherein the first output optical waveguide is a hollow core optical waveguide formed as a channel in a substrate.

15. An optical circuit according to claim 14 wherein the amplifying optical waveguide comprises an amplifying optical fibre and the optical circuit comprises a further optical fibre attachment arranged to receive the amplifying optical fibre.

16. An optical circuit according to claim 14 wherein the amplifying optical waveguide comprises an amplifying material formed as an elongate waveguide in or on the substrate.

17. An optical circuit according to claim 14 wherein a second output hollow core optical waveguide for carrying a pump beam is formed as a channel in the substrate and means are provided to optically couple the pump beam from the second output hollow core optical waveguide into an amplifying waveguide via the first output hollow core optical waveguide.

18. An optical circuit according to claim 17 and further comprising a laser source arranged to couple a pump beam into the second output hollow core optical waveguide.

19. An optical circuit according to claim 14 wherein at least one optical isolator is provided within the optical path defined by the first output hollow core optical waveguide.

20. An optical circuit according to claim 14 wherein at least one optical tap is provided within the optical path defined by the first output hollow core optical waveguide.

21. An optical circuit according to claim 14 wherein at least one optical filter is provided within the optical path defined by the first output hollow core optical waveguide.

22. An optical circuit for an optical amplifier comprising an optical circuit for an amplifier input stage according to claim 1 and an optical circuit for an amplifier output stage.

23. An optical circuit according to claim 22 wherein the optical circuits for the input and output stages are formed on a single substrate.

24. An optical circuit according to claim 1 wherein the substrate comprises semiconductor material.

25. An optical circuit according to claim 24 wherein the substrate comprises a silicon on insulator (SOI) wafer.

26. An optical circuit according to claim 1 formed by micro-fabrication techniques.

27. An optical circuit according to claim 26 wherein the micro-fabrication technique includes deep reactive ion etching.

28. An optical circuit according to claim 1 wherein the hollow core optical waveguides are of substantially rectangular cross section.

29. An apparatus according to claim 1 wherein the hollow core optical waveguides are dimensioned to preferably guide radiation propagating in the fundamental mode.

30. An apparatus according to claim 1 wherein the hollow core optical waveguides are dimensioned to preferably guide radiation propagating in multiple optical modes.

31. An optical circuit according to claim 1 wherein the internal surfaces of the hollow core optical waveguides carry a reflective coating.

32. An optical circuit according to claim 1 wherein the substrate comprises a base portion and a lid portion.

33. An optical amplifier comprising an optical circuit according to claim 1.

34. An optical amplifier according to claim 33 and further comprising an erbium doped optical fibre.

* * * * *